United States Patent [19]

Raspanti

[11] Patent Number: 5,658,973
[45] Date of Patent: Aug. 19, 1997

[54] COMPOSITIONS FOR THE STABILIZATION OF SYNTHETIC POLYMERS

[75] Inventor: Giuseppe Raspanti, Bergamo, Italy

[73] Assignee: 3V Inc., Weehawken, N.J.

[21] Appl. No.: 507,197

[22] Filed: Jul. 26, 1995

[51] Int. Cl.$^6$ .................. C08K 5/54; C08K 5/3492; C08K 5/3435
[52] U.S. Cl. .................. 524/99; 252/405; 524/100; 524/102; 524/103
[58] Field of Search ............. 524/100, 99, 102, 524/103; 252/405

[56] References Cited

U.S. PATENT DOCUMENTS

| | | | |
|---|---|---|---|
| 4,086,204 | 4/1978 | Cassandrini et al. | 544/198 |
| 4,108,829 | 8/1978 | Cassandrini et al. | 544/198 |
| 4,233,412 | 11/1980 | Rody et al. | 525/167 |
| 4,331,586 | 5/1982 | Hardy | 524/97 |
| 4,477,615 | 10/1984 | Raspanti et al. | 524/100 |
| 4,692,486 | 9/1987 | Gugumus | 524/100 |
| 4,863,981 | 9/1989 | Gugumus | 524/100 |
| 4,927,930 | 5/1990 | Cantatore et al. | 544/198 |
| 4,933,451 | 6/1990 | Cantatore et al. | 524/100 |
| 5,021,485 | 6/1991 | Gugumus | 524/100 |

FOREIGN PATENT DOCUMENTS

| | | |
|---|---|---|
| 343717 | 11/1989 | European Pat. Off. |
| 57-38589 | 8/1982 | Japan. |

OTHER PUBLICATIONS

Tomoyuki Kurumada, et al., "Synergism of Hindered Amine Light Stabilizers and UV-Absorbers", Polymer Degradation and Stability 19 (1987) 263–272.

Primary Examiner—Veronica P. Hoke
Attorney, Agent, or Firm—Griffin, Butler, Whisenhunt & Kurtossy

[57] ABSTRACT

A composition for stabilizing synthetic polymers consisting of a blend of
a) at least a derivative of a high molecular weight polymethylpiperidine of formula (I)

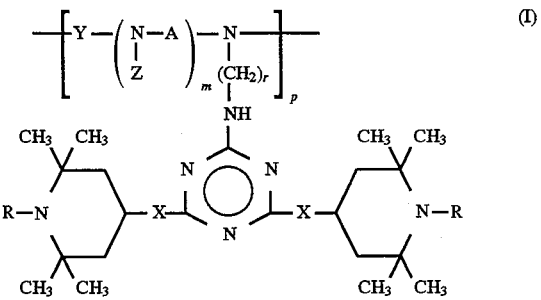

wherein the groups are as defined hereinafter, and
b) at least one other HALS stabilizer wherein the groups are as defined hereinafter is disclosed. These compositions show photostabilizing and antioxidant properties.

15 Claims, No Drawings

COMPOSITIONS FOR THE STABILIZATION OF SYNTHETIC POLYMERS

The present invention relates to compositions consisting of mixtures of two or more different derivatives of high molecular weight polymethylpiperidine and to their use as stabilizing agents for synthetic polymers.

BACKGROUND OF THE INVENTION

The use of compounds containing the polymethylpiperidine group, and mainly 2,2,6,6-tetramethyl-o 1,2,2,6,6-pentamethylpiperidine, for the photostabilization of polymers is well known and to this end a wide literature exists.

Generally this class of stabilizing agents is divided into two groups, namely those having low molecular weight (about 700) and those with high molecular weight (higher than 700).

A detailed disclosure of some stabilizing agents of this class, the so called hindered amines, of their different kinds and of their applicative characteristics is found in Gaechter-Mueller/Taschenbuch der Kunststoff-Additive, 2 Ausgabe 1983 pagg. 144–198.

U.S. Pat. Nos. 4,692,486, 5,021,485 and EP 0080431 disclose some synergistic mixtures of derivatives of low and high molecular weight polyalkylpiperidines as photostabilizing agents for polymers. U.S. Pat. No. 4,863,981 discloses also mixtures containing two different derivatives of polymethylpiperidine, both of them having high molecular weight, as photostabilizing agents for polymers.

It has surprisingly been found that new particular combinations of compounds, all of them having high molecular weight, containing polymethylpiperidine groups, in addition to synergistic properties as photostabilizing agents, also show synergistic activity in the long term heat stabilization of synthetic polymers. As used herein, the wording "long term heat stabilization" is intended to mean that the polymer is stabilized against the degradation which occurs during the time of use of the polymer itself. As far as it is known to the applicant, said synergistic activity in the long term heat stabilization was nor disclosed nor suggested in the prior art.

DISCLOSURE OF THE INVENTION

An object of the present invention is a composition for the stabilization of synthetic polymers consisting of a mixture of:

a) at least a compound of formula (I)

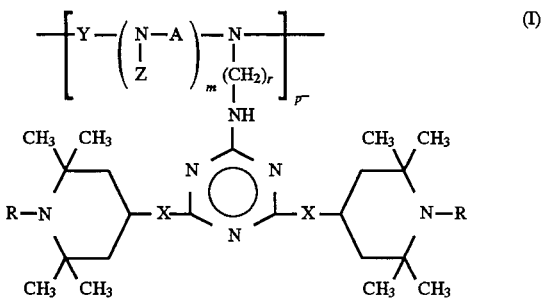

wherein R is hydrogen or methyl, X is oxygen or the N—$R_1$ group, in which $R_1$ is hydrogen or a $C_1$–$C_{12}$ straight or branched alkyl, r is a number ranging from 2 to 8, included; A is —$(CH_2)_n$—, in which n can be a number from 2 to 8, the group

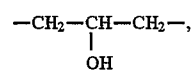

or the group

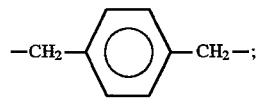

Z is hydrogen, $C_1$–$C_{18}$ alkyl, the group of formula (II) or the piperidine of formula (III):

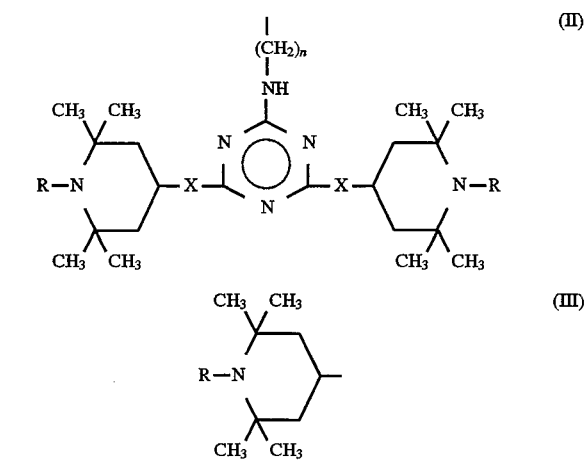

wherein R, X and n have the above defined meaning;
m is zero or 1;
Y, when m is zero, has the same meaning of A, when m is 1 can have the same meaning of A or is one of the following groups

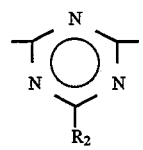

—CO—$R_3$—CO; —CO—NH—$R_4$—NH—CO— in which $R_2$ is an optionally substituted aryl residue, having from 6 to 14 carbon atoms or the

group in which $R_5$ and $R_6$ can be the same or different and are hydrogen, a $C_1$–$C_{18}$ straight or branched alkyl group, a cycloalkyl group having from 5 to 12 carbon atoms, an aryl group having from 6 to 12 carbon atoms, an aralkyl group having from 7 to 12 carbon atoms; the piperidine group of formula (III) or, together the nitrogen atom which they are linked to, can form a heterocyclic ring having from 5 to 7 members, optionally containing also oxygen as heteroatom;
$R_3$ is phenylene or —$(CH_2)_n$—;
$R_4$ is toluylene, xylylene or —$(CH_2)_n$—, in which n has the above defined meaning;
p can vary from 2 to 100;
the terminal groups can be Cl or H; and b) at least a compound of formula (IV), (V); (VI) or (VII)

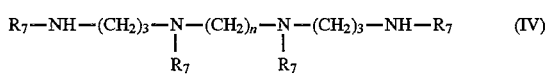 (IV)

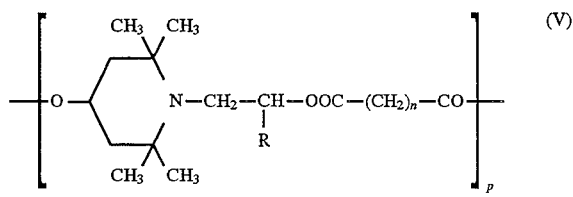 (V)

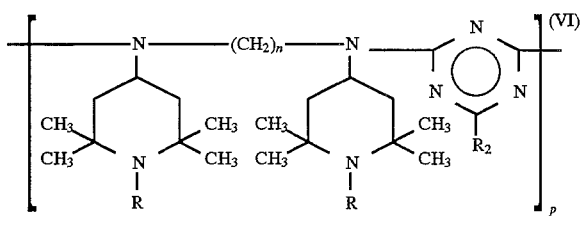 (VI)

 (VII)

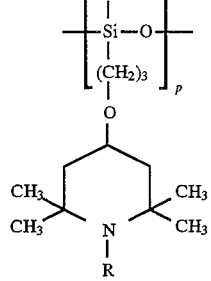

wherein $R_7$ is a group of formula

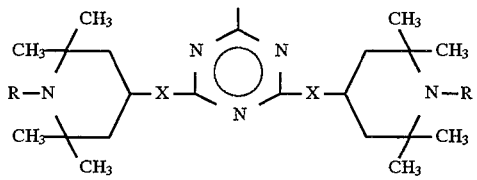

wherein X and R are as above defined;
R, $R_2$, n and p have the above meaning, the terminal groups can be hydrogen for compounds (V), chlorine or hydrogen for compounds (VI) and methyl for compounds (VII).

Examples of $C_1$–$C_{18}$ straight or branched alkyl group are methyl, ethyl, n-propyl, isopropyl, n-butyl, tert-butyl, pentyl, neo-pentyl, hexyl, heptyl, decyl, dodecyl, hexadecyl, octadecyl.

Examples of optionally substituted aryl group having from 6 to 14 carbon atoms are phenyl, toluyl, o-, m-, p-xylyl.

Examples of cycloalkyl group having from 5 to 12 carbon atoms are cyclopentyl, cyclohexyl, cyclododecyl.

Examples of aralkyl group having from 7 to 12 carbon atoms are benzyl, 4-tert-butylbenzyl.

Examples of heterocyclic group having from 5 to 7 members are: pyrrolidine, piperidine, hexamethyleneimine, morpholine.

The compounds of formula (I), (IV), (V), (VI) and (VII) are known; their methods of preparation as well as their uses as stabilizing agents are described in patents U.S. Pat. Nos. 4,477,615, 4,233,412, 4,108,829, 4,086,204, 4,331,586, EP 0255181.

However, the stabilizing compositions according to the present invention show a photoprotective activity higher than the single components of formula (I) or (IV–VII).

In a first preferred embodiment of the present invention, the component a) is represented by the compound of formula (VIII)

 (VIII)

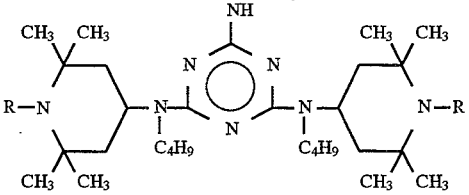

wherein Z, Y, R, n and p have the above defined meaning; r is 2 or 3.

In a second preferred embodiment of the present invention, the component a) is represented by the compound of formula (IX)

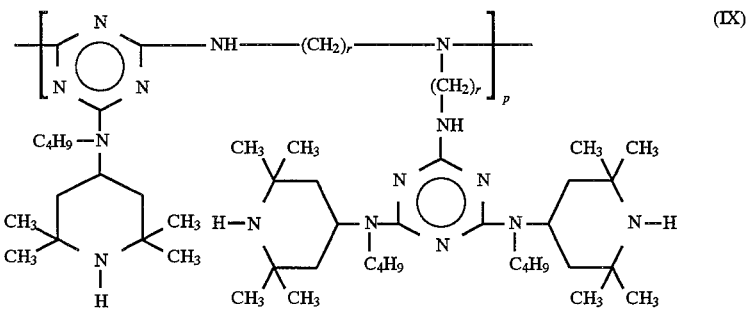 (IX)

wherein r and p are as above defined.

In a third preferred embodiment of the present invention, the component a) is represented by the compound of formula (X)

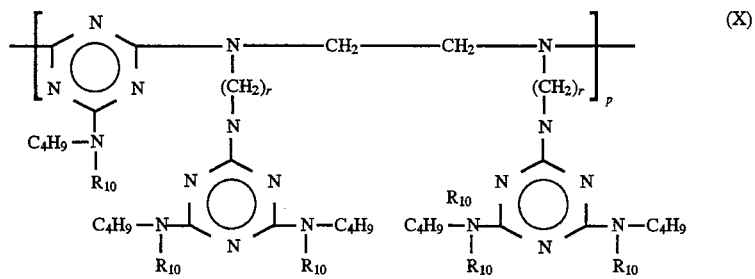 (X)

wherein r and p are as above defined, $R_{10}$ is a group of formula (III).

Examples of compounds of formula I are:

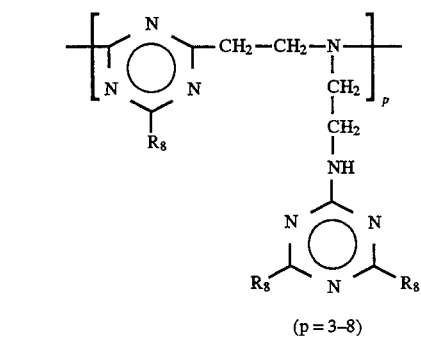 compound 1

(p = 3–8)

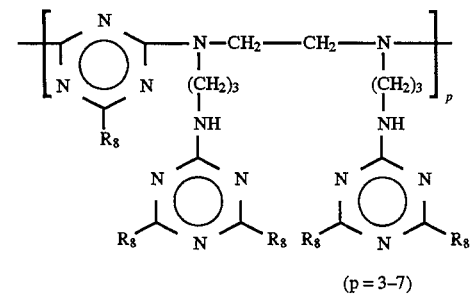 compound 2

(p = 3–7)

wherein

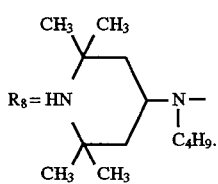

An example of compound of formula IV is:

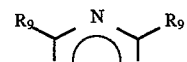 compound 3 wherein

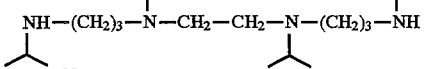

An example of compound of formula V is:

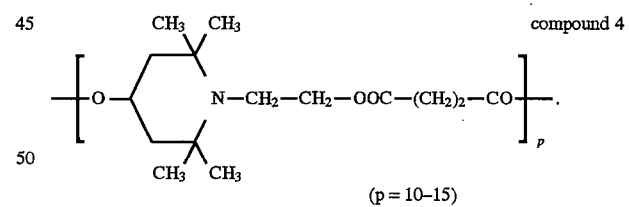 compound 4

(p = 10–15)

Examples of compounds of formula VI are:

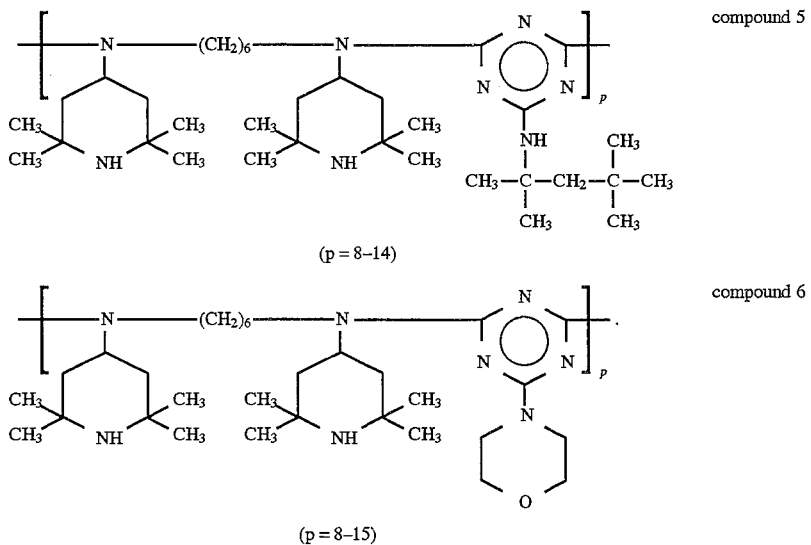

compound 5

(p = 8–14)

compound 6

(p = 8–15)

An example of compound of formula VII is:

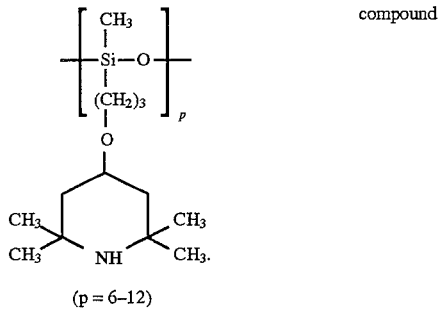

compound 7

(p = 6–12)

The concentration of the stabilizing compositions according to the present invention in the polymers can generally vary from 0.01 to 5% and preferably from 0.05 to 2% with respect to the weight of the polymer. Nevertheless, the stabilizing mixture can be added to the polymers also in very high amounts, for example 5–25% by weight, for the preparation of masterbatches.

The incorporation can be carried out according to various methods, for example by dry mixing the polymer with the stabilizing mixture or said mixture can be added to a suspension of the polymer to be stabilized in a suitable solvent and subsequently evaporating off the solvent.

Subsequently the polymers containing the stabilizing mixture are extruded or treated according to methods usually known in the art.

According to the present invention the compositions of compounds of formula (I) and respectively of formula (IV)–(VII) are used for the stabilization of synthetic polymers, particularly of polyolefins such as for example low and high density polyethylene, polypropylene, polymethylpentene, polyisoprene, polystyrene, polymethylstyrene and copolymers thereof and/or with other vinyl monomers as for example acrylonitrile, vinyl acetate, acryl esters.

The stabilizing compositions according to the present invention can be used also together with other additives commonly used in the technology of the synthetic polymers, such as for example: antioxidants, for example those belonging to the classes of phenols, thioethers, phosphites and phosphonites; UV-absorber, for example oxanilydes, benzotriazole and benzophenone derivatives; nickel complexes; metal deactivators, for example oxalic acid amides, plasticizers, antistatic agents, pigments, optical bleaching agents, flame retarders.

The following examples further disclose the present invention.

EXAMPLE 1

1.000 g of low density polyethylene (Riblene EF 2100 V-Enichem®), 2 g of n-octadecyl-3-(3,5-di-tert-butyl-4-hydroxyphenyl)propionate, 1 g of calcium stearate and 1 g of a stabilizing agent, according to the present invention, or of a mixture thereof in 50:50 w/w ratio, were mixed homogeneously. The mixtures were extruded at 190° C. and transformed into pellets. From these pellets, by means of pressure forming at 200° C., films of 0.2 mm thickness were obtained.

Samples of these films were subjected to UV radiation in a Weatherometer WOM Ci-65® at a black panel temperature of 63° C. In the irradiated samples the increase of the carbonyl band at 5.85 nm in the infrared was measured and the T-0.1, i.e. the time necessary to give an increase of 0.1 of the carbonyl band, was determined. The results are reported in the following Table 1.

TABLE 1

| Stabilizing agent | T 0.1 (hours) |
|---|---|
| Without stabilizing agent | 300 |
| Compound 1 | 2100 |
| Compound 2 | 2000 |
| Compound 3 | 1950 |
| Compound 4 | 1750 |
| Compound 5 | 2100 |
| Compound 7 | 1650 |
| Compounds 1 + 3 | 2750 |
| Compounds 1 + 4 | 2850 |
| Compounds 1 + 5 | 2650 |
| Compounds 2 + 5 | 2800 |
| Compounds 1 + 7 | 2600 |
| Compounds 4 + 5 (according to US 4 863 981) | 2800 |

EXAMPLE 2

Homogeneous mixtures, consisting of 1,000 g of polypropylene, (Moplen FLF 20-Himont®), 1 g of 1,3,5-tris-(3,5-di-tert-butyl-4-hydroxybenzyl)isocyanurate, 0.5 g of calcium stearate and 2 g of a stabilizing agent or of a 50:50 mixture thereof were prepared. The mixtures were extruded at 250° C. and granulated. From these, by means of pressure forming at 260° C., 1 mm thickness-test pieces were obtained.

The so obtained test pieces were subjected to atmospheric oxygen action by heating at 130° C. in a forced air circulation oven.

The degradation was evaluated by determining the time necessary for the "chalky" appearance on test pieces.

The results are reported in the following Table 2.

TABLE 2

| Stabilizing agent | T (days) |
|---|---|
| Without stabilizing agent | 34 |
| Compound 1 | 55 |
| Compound 2 | 57 |
| Compound 3 | 49 |
| Compound 4 | 54 |
| Compound 5 | 57 |
| Compound 7 | 41 |
| Compounds 1 + 3 | 85 |
| Compounds 2 + 4 | 81 |
| Compounds 1 + 5 | 80 |
| Compounds 2 + 5 | 78 |
| Compounds 1 + 7 | 76 |
| Compounds 4 + 5 (according to US 4 863 981) | 58 |

I claim:

1. A composition for the stabilization of synthetic polymers comprising an about 1:1 ratio of the following components a) and b) wherein:

a) is at least one compound of formula (I)

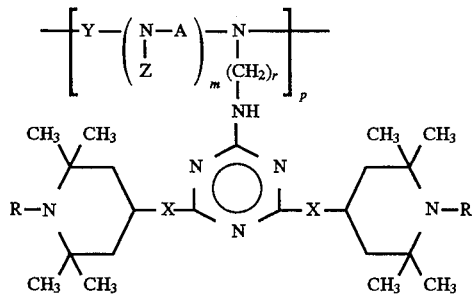

wherein R is hydrogen or methyl, X is oxygen or the group N—$R_1$, in which $R_1$ is hydrogen or $C_1$–$C_{12}$ straight or branched alkyl group, r is a number ranging from 2 to 8, included;

A is —$(CH_2)_n$—, in which n can be a number from 2 to 8, the

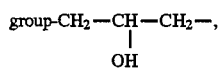

or the group

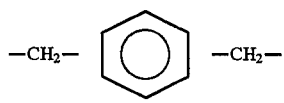

Z is hydrogen, $C_1$–$C_{18}$ alkyl, the group of formula (II) or the piperidine of formula (III)

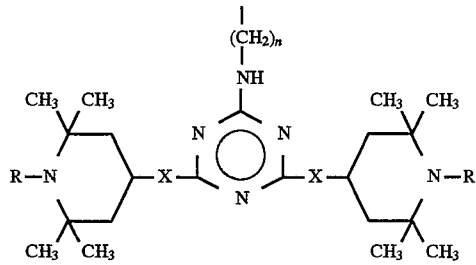

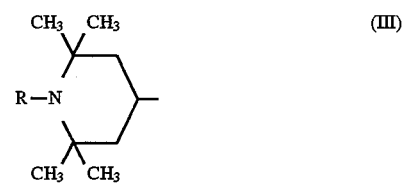

wherein R, X and n have the meaning above defined;

m is zero or 1;

Y, when m is zero, has the same meaning of A, when m is 1 can have the same meaning of A or is one of the following groups

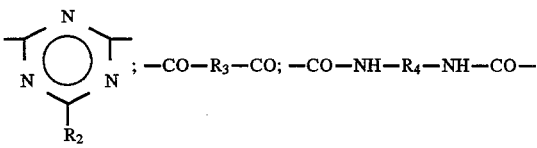

in which $R_2$ is an optionally substituted aryl residue, having from 6 to 14 carbon atoms or the

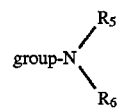

in which $R_5$ and $R_6$ can be the same or different and are hydrogen, a $C_1$–$C_{18}$ straight or branched alkyl group, a cycloalkyl group having from 5 to 12 carbon atoms, an aryl group having from 6 to 12 carbon atoms, an aralkyl group having from 7 to 12 carbon atoms; the piperidine group of formula (III) or, together the nitrogen atom, can form a 5 to 7 member heterocyclic ring, optionally containing oxygen as heteroatom;

$R_3$ is phenylene or —$(CH_2)_n$—;

$R_4$ is toluylene, xylylene or —$(CH_2)_n$—, in which n has the above defined meaning, p can range from 2 to 100;

the terminal groups can be Cl or H; and b) is at least one compound of formula (IV), (V); (VI) or (VII)

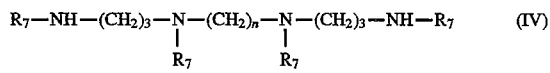

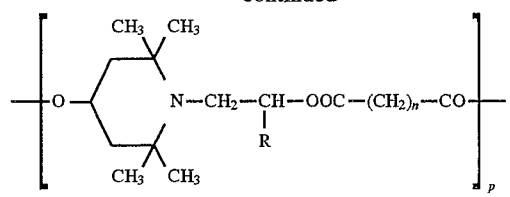

(V)

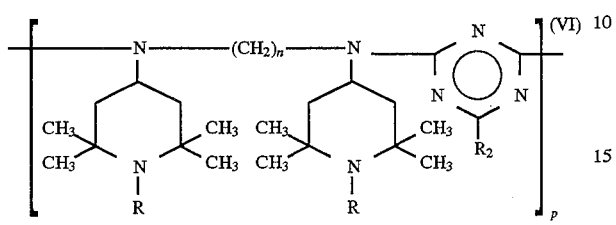

(VI)

-continued

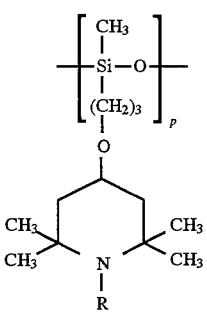

(VII)

wherein $R_7$ is a group of formula

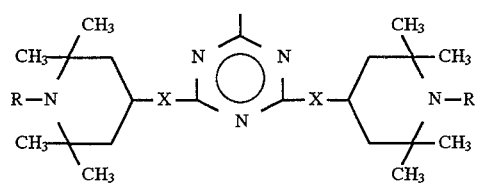

wherein R, X, n and p are as above identified.

2. A composition according to claim 1, wherein said compound a) is a compound of formula (VIII), and said compound b) is a compound of formula (IV)–(VII)

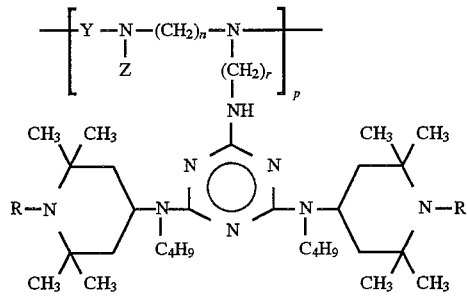

(VIII)

wherein Z, Y, R, n and p are as above defined, r is 2 or 3.

3. A composition according to claim 1, wherein said compound a) is a compound of formula (IX), and said compound b) is a compound of formula (IV)–(VII)

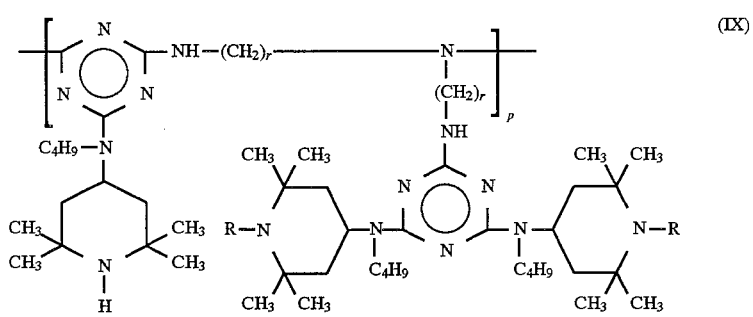

(IX)

wherein r and p are as above defined.

4. A composition according to claim 1, wherein a) is a compound of formula (X) and b) is a compound of formula (IV)–(VII)

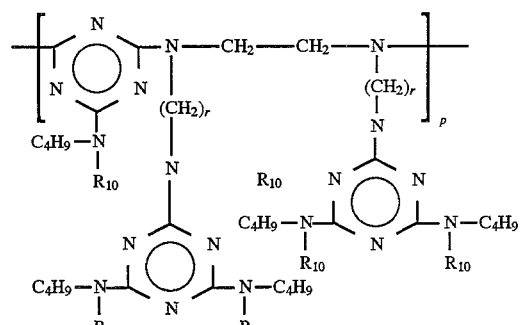

(X)

wherein r and p are as above defined and $R_{10}$ is a group of formula (III)

$$\text{(III)}$$

wherein R is as above defined.

5. Masterbatch for the stabilization of synthetic polymers containing from 5 to 25% by weight of composition of claim 1.

6. A composition according to claim 1, consisting of a) and b).

7. A method for stabilizing synthetic polymers, comprising the step of adding to a polyolefin an effective stabilizing amount of a composition comprising an about 1:1 ratio of the following components a) and b) wherein:

a) is at least one compound of formula (I)

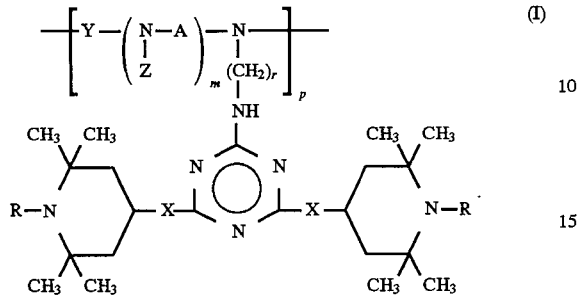
(I)

wherein R is hydrogen or methyl, X is oxygen or the group N—$R_1$, in which $R_1$ is hydrogen or $C_1$–$C_{12}$ straight or branched alkyl group, r is a number ranging from 2 to 8, included;

A is —$(CH_2)_n$—, in which n can be a number from 2 to 8, the

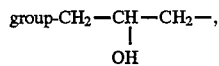

or the group

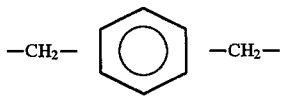

Z is hydrogen, $C_1$–$C_{18}$ alkyl, the group of formula (II) or the piperidine of formula (III)

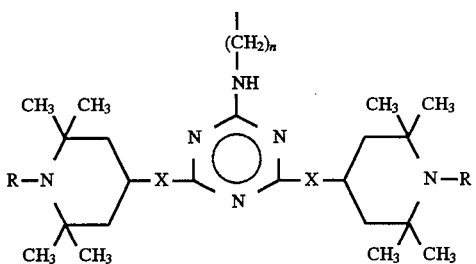
(II)

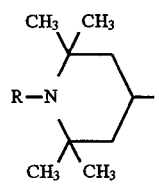
(III)

wherein R, X and n have the meaning above defined;

m is zero or 1;

Y, when m is zero, has the same meaning of A, when m is 1 can have the same meaning of A or is one of the following groups

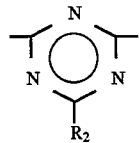

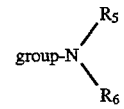

—CO—$R_3$—CO—; —CO—NH—$R_4$—NH—CO— in which $R_2$ is an optionally substituted aryl residue, having from 6 to 14 carbon atoms or the group-N$\begin{matrix}R_5\\R_6\end{matrix}$ in which $R_5$ and $R_6$ can be the same or different and are hydrogen, a $C_1$–$C_{18}$ straight or branched alkyl group, a cycloalkyl group having from 5 to 12 carbon atoms, an aryl group having from 6 to 12 carbon atoms, an aralkyl group having from 7 to 12 carbon atoms; the piperidine group of formula (III) or, together the nitrogen atom, can form a 5 to 7 member heterocyclic ring, optionally containing oxygen as heteroatom;

$R_3$ is phenylene or —$(CH_2)_n$—;

$R_4$ is toluylene, xylylene or —$(CH_2)_n$—, in which n has the above defined meaning.

p can range from 2 to 100;

the terminal groups can be Cl or H; and b) at least a compound of formula (IV), (V); (VI) or (VII)

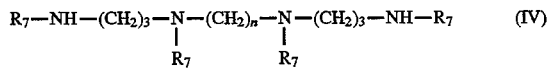
(IV)

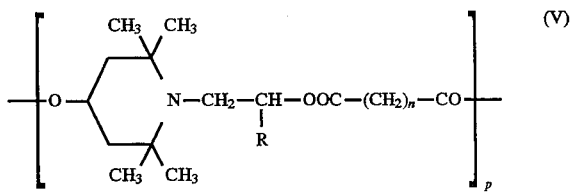
(V)

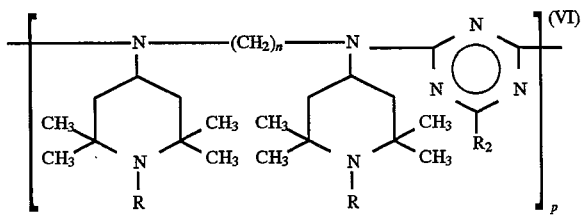
(VI)

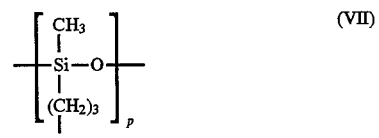
(VII)

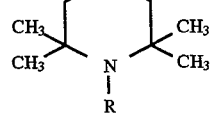

wherein $R_7$ is a group of formula

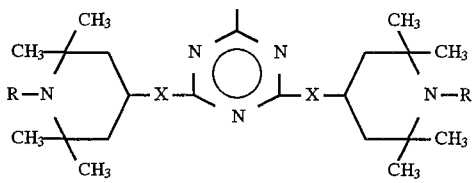

wherein R, X, n and p are as above identified.

8. A method for stabilizing synthetic polymers, according to claim 7, wherein said compound a) is a compound of formula (VIII),

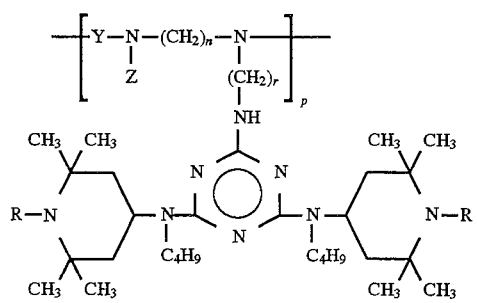

(VIII)

wherein X, Y, R, n and p are as above defined, r is 2 or 3.

9. A method according to claim 7, wherein said compound a) is a compound of formula (IX), and said compound b) is a compound of formula (IV)–(VII)

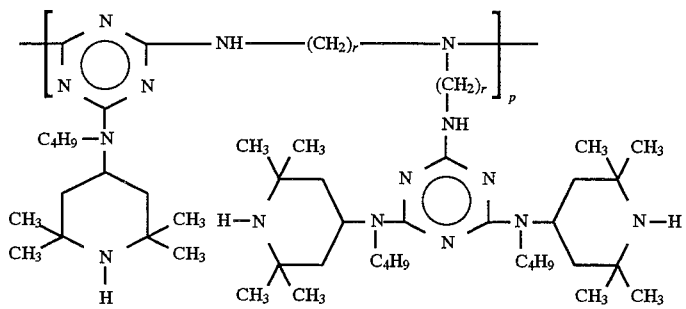

(IX)

wherein r and p are as above defined.

10. A method according to claim 7, wherein a) is a compound of formula (X) and b) a compound of formula (IV)–(VII)

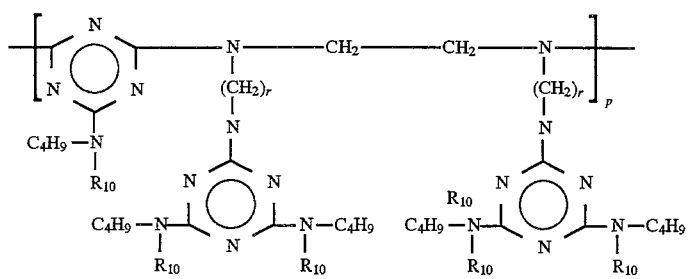

(X)

wherein r and p are as above defined and $R_{10}$ is a group of formula (III)

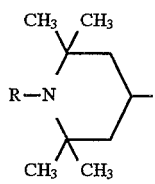

(III)

wherein R is as above defined.

11. A stabilized polymer comprising a polyolefin and a composition for the stabilization of synthetic polymers comprising an about 1:1 ratio of the following components a) and b) wherein:

a) is at least one compound of formula (I)

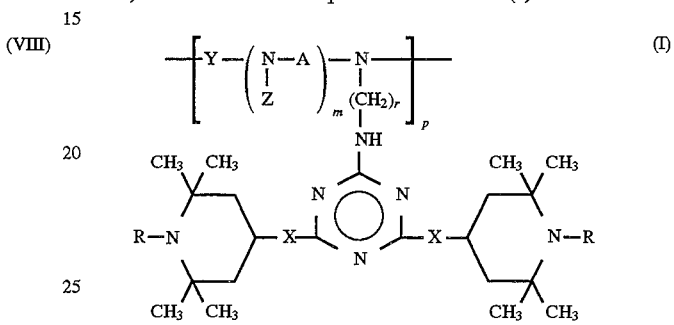

(I)

wherein R is hydrogen or methyl, X is oxygen or the group N—$R_1$, in which $R_1$ is hydrogen or $C_1$–$C_{12}$ straight or branched alkyl group, r is a number ranging from 2 to 8, included;

A is —$(CH_2)_n$—, in which n can be a number from 2 to 8, the $$\text{group-CH}_2\text{—CH—CH}_2\text{—},$$
$$\quad\quad\quad\quad\quad\quad |$$
$$\quad\quad\quad\quad\quad\text{OH}$$

or the group

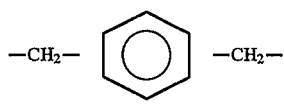

Z is hydrogen, $C_1$–$C_{18}$ alkyl, the group of formula (II) or the piperidine of formula (III)

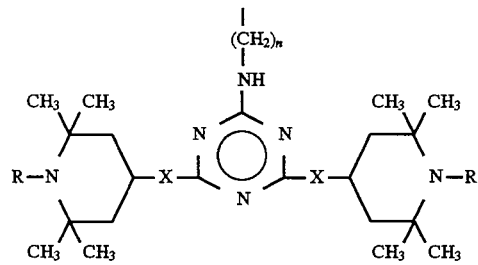
(II)

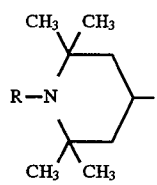
(III)

wherein R, X and n have the meaning above defined;

m is zero or 1;

Y, when m is zero, has the same meaning of A, when m is 1 can have the same meaning of A or is one of the following groups

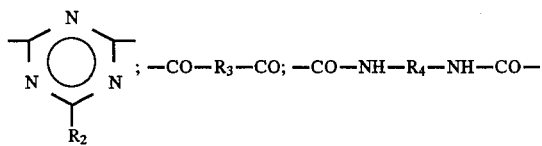 ; —CO—$R_3$—CO—; —CO—NH—$R_4$—NH—CO— in which $R_2$ is an optionally substituted aryl residue, having from 6 to 14 carbon atoms or the

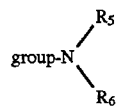

in which $R_5$ and $R_6$ can be the same or different and are hydrogen, a $C_1$–$C_{18}$ straight or branched alkyl group, a cycloalkyl group having from 5 to 12 carbon atoms, an aryl group having from 6 to 12 carbon atoms, an aralkyl group having from 7 to 12 carbon atoms; the piperidine group of formula (III) or, together the nitrogen atom, can form a 5 to 7 member heterocyclic ring, optionally containing oxygen as heteroatom;

$R_3$ is phenylene or —$(CH_2)_n$—;

$R_4$ is toluylene, xylylene or —$(CH_2)_n$—, in which n has the above defined meaning, p can range from 2 to 100;

the terminal groups can be Cl or H; and b) at least a compound of formula (IV), (V); (VI) or (VII)

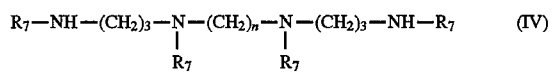 (IV)

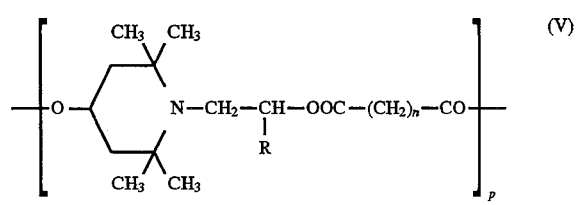 (V)

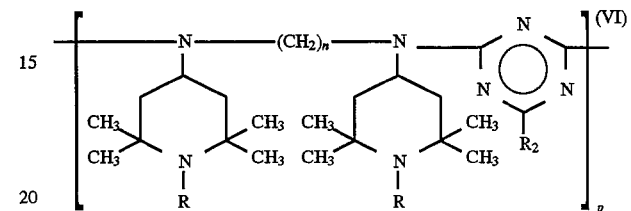 (VI)

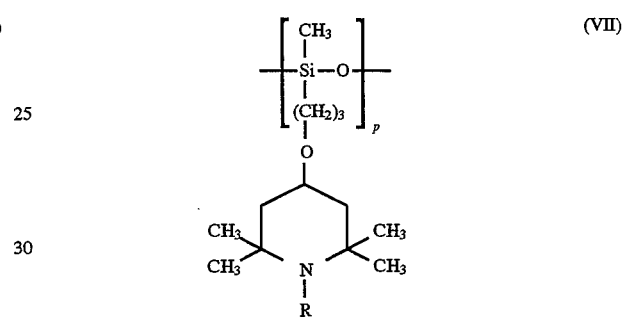 (VII)

wherein $R_7$ is a group of formula

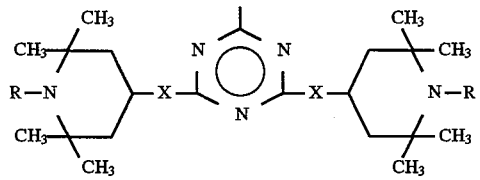

wherein R, X, n and p are as above identified.

12. A stabilized polymer according to claim 11 wherein said compound a) is a compound of formula (VIII), and said compound b) is a compound of formula (IV)–(VII)

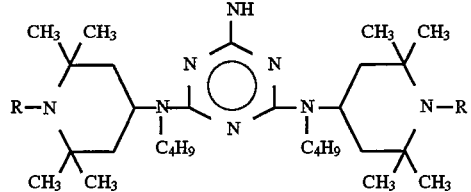 (VIII)

wherein Z, Y, R, n and p are as above defined, r is 2 or 3.

13. A stabilized polymer according to claim 11 wherein said compound a) is a compound of formula (IX), and said compound b) is a compound of formula (IV)–(VII)

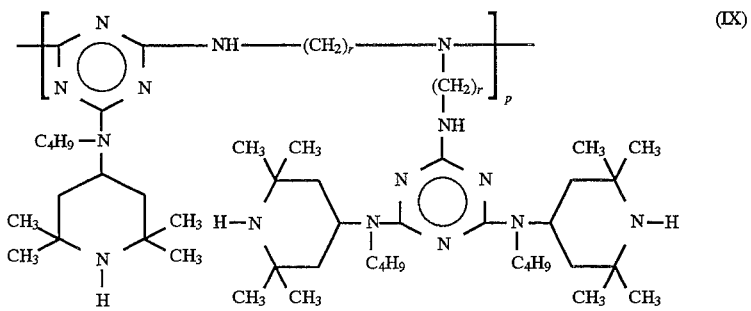
(IX)
wherein r and p are as above defined.
14. A stabilized polymer according to claim 11 wherein a) is a compound of formula (X) and b) is a compound of formula (IV)–(VII)
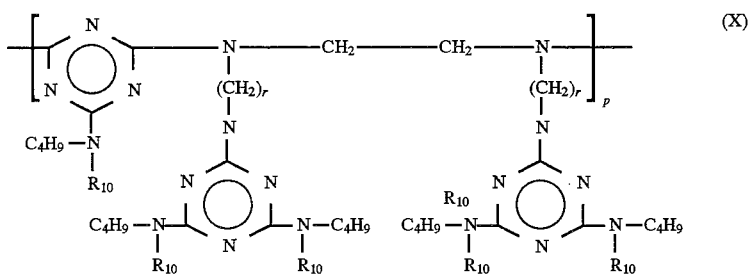
(X)
wherein r and p are as above defined and $R_{10}$ is a group of formula (III)
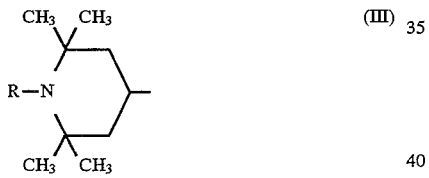
(III)
wherein R is as above defined.
15. A stabilized polymer according to claim 11 wherein said composition is present in an amount from 0.01 to 5% w-w.
* * * * *